(12) United States Patent
Zhuang et al.

(10) Patent No.: US 11,258,724 B2
(45) Date of Patent: Feb. 22, 2022

(54) METHOD AND DEVICES FOR DOMAIN NAME BANDWIDTH ADJUSTMENT

(71) Applicant: WANGSU SCIENCE & TECHNOLOGY CO., LTD., Shanghai (CN)

(72) Inventors: Xiaochuan Zhuang, Shanghai (CN); Hong Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 276 days.

(21) Appl. No.: 16/616,221

(22) PCT Filed: Nov. 2, 2018

(86) PCT No.: PCT/CN2018/113731
§ 371 (c)(1),
(2) Date: Nov. 22, 2019

(87) PCT Pub. No.: WO2020/077696
PCT Pub. Date: Apr. 23, 2020

(65) Prior Publication Data
US 2021/0367902 A1 Nov. 25, 2021

(30) Foreign Application Priority Data
Oct. 18, 2018 (CN) .......................... 201811216763.4

(51) Int. Cl.
*H04L 12/915* (2013.01)
*H04L 47/785* (2022.01)
*H04L 47/10* (2022.01)

(52) U.S. Cl.
CPC ............ *H04L 47/785* (2013.01); *H04L 47/29* (2013.01)

(58) Field of Classification Search
CPC .............................. H04L 47/785; H04L 47/29
See application file for complete search history.

(56) References Cited

U.S. PATENT DOCUMENTS 9,350,616 B1 * 5/2016 Lou .......................... H04L 47/12
2004/0100903 A1 5/2004 Han et al.
(Continued)

FOREIGN PATENT DOCUMENTS

CN 101867580 A 10/2010
CN 105450774 A 3/2016
(Continued)

OTHER PUBLICATIONS

The World Intellectual Property Organization (WIPO) International Search Report and Written Opinion for PCT/CN2018/113731 dated Jul. 15, 2019 9 pages.

*Primary Examiner* — Minh Trang T Nguyen (57) ABSTRACT

The present disclosure provides a method and related devices for domain name bandwidth adjustment. The method includes: receiving domain name bandwidth information reported by each on-site bandwidth management server and based on the domain name bandwidth information, determining a target domain name having the domain name bandwidth exceeding a specified bandwidth threshold; determining a to-be-adjusted bandwidth corresponding to the target domain name, and allocating the to-be-adjusted bandwidth among a plurality of sites; determining a bandwidth control threshold of the target domain name for the corresponding site; and generating a flow control instruction containing the bandwidth control threshold, and sending the generated flow control instruction to the on-site bandwidth management server at the corresponding site, where the on-site bandwidth management server adjusts the domain name bandwidth of the target domain name in each node server at the site.

16 Claims, 7 Drawing Sheets (56) References Cited

U.S. PATENT DOCUMENTS

2017/0331667 A1   11/2017  Cai
2018/0159796 A1    6/2018  Wang et al.
2020/0366583 A1*  11/2020  Jiang ..................... H04L 43/12

FOREIGN PATENT DOCUMENTS

| CN | 106034083 A | 10/2016 |
|----|-------------|---------|
| CN | 107707382 A | 2/2018 |
| CN | 108667658 A | 10/2018 |
| WO | 2016141820 A1 | 9/2016 |

\* cited by examiner

METHOD AND DEVICES FOR DOMAIN NAME BANDWIDTH ADJUSTMENT

CROSS-REFERENCES TO RELATED APPLICATIONS

This application is a national phase entry under 35 U.S.C § 371 of International Application No. PCT/CN2018/113731, filed on Nov. 2, 2018, which claims priority of Chinese Patent Application No. 201811216763.4, filed with the State Intellectual Property Office of P. R. China on Oct. 18, 2018, the entire contents of all of which are incorporated herein by reference.

FIELD OF THE DISCLOSURE

The present disclosure relates to the field of Internet technology, and more particularly, relates to a method and devices for domain name bandwidth adjustment.

BACKGROUND

As the live streaming business grows rapidly, to provide stable and fast live streaming services to users, live streaming platforms often select content delivery network (CDN) or cloud service providers to expedite live streaming contents. Serving massive number of live streaming users, certain service nodes in the CDN are likely to encounter sudden surges of bandwidth demands. In this case, the overall bandwidth demands of the entire CDN will increase, thereby degrading normal services to other users.

Currently, each node in the CDN is often configured with a bandwidth threshold. Once the bandwidth demand of a customer at the node exceeds the bandwidth threshold, the customer's access will be denied. However, the method of limiting the bandwidth may only be applied to individual nodes. If the same customer simultaneously accesses a plurality of nodes, the method is not effective to moderate the overall bandwidth demand of the customer.

BRIEF SUMMARY OF THE DISCLOSURE

The objective of the present disclosure is to provide a method and related devices for domain name bandwidth adjustment that can globally adjust the bandwidth of a customer.

To achieve the above objective, one aspect of the present disclosure provides a method for domain name bandwidth adjustment to be executed by a global bandwidth control server. The method includes: receiving domain name bandwidth information reported by each on-site bandwidth management server and based on the domain name bandwidth information, determining a target domain name having the domain name bandwidth exceeding a specified bandwidth threshold; determining a to-be-adjusted bandwidth corresponding to the target domain name, and based on a quantity of node servers included at each site, allocating the to-be-adjusted bandwidth among a plurality of sites to obtain a bandwidth allocation for each of the plurality of sites; based on a current domain name bandwidth of the target domain name and the bandwidth allocation at each site, determining a bandwidth control threshold of the target domain name for the corresponding site; and generating a flow control instruction containing the bandwidth control threshold, and sending the generated flow control instruction to the on-site bandwidth management server at the corresponding site, where the on-site bandwidth management server adjusts the domain name bandwidth of the target domain name in each node server at the site.

To achieve the above objective, another aspect of the present disclosure provides a global bandwidth control server. The global bandwidth control server includes a memory configured to store a computer program; and a processor configured to execute the computer program stored in the memory to implement the disclosed method.

To achieve the above objective, another aspect of the present disclosure provides a method for domain name bandwidth adjustment to be executed by an on-site bandwidth management server. The method includes: receiving node bandwidth information including at least one domain name bandwidth reported by each node server and based on the node bandwidth information, aggregating a sitewide bandwidth of each domain name at a current site; reporting the aggregated sitewide bandwidth of each domain name and a quantity of node servers at the current site to a global bandwidth control server; receiving a flow control instruction sent by the global bandwidth control server, where the flow control instruction includes a bandwidth control threshold of a target domain name at the current site; and based on the flow control instruction, adjusting the domain name bandwidth of the target domain name in each node server at the current site.

To achieve the above objective, another aspect of the present disclosure provides an on-site bandwidth management server. The on-site bandwidth management server includes: a memory configured to store a computer program; and a processor configured to execute the computer program stored in the memory to implement the disclosed method.

To achieve the above objective, another aspect of the present disclosure provides a method for domain name bandwidth adjustment to be executed by a node server. The method includes: self-collecting node bandwidth information, and reporting the node bandwidth information to an on-site bandwidth management server at a current site where the node server is located, where the node bandwidth information includes domain name bandwidth of each domain name served by the node server; receiving a flow control instruction sent by the on-site bandwidth management server, where the flow control instruction includes a node-level control threshold of a target domain name; based on the flow control instruction, adjusting the domain name bandwidth of the target domain name, where the adjusted domain name bandwidth of the target domain name is smaller than or equal to the node-level control threshold of the target domain name.

To achieve the above objective, another aspect of the present disclosure provides a node server. The node server includes: a memory configured to store a computer program; and a processor configured to execute the computer program stored in the memory to implement the disclosed method.

In the technical solute provided by the embodiments of the present disclosure, the node server at the site may report the node bandwidth information for each domain name served by the node server to the on-site bandwidth management server. The on-site bandwidth management server aggregates the domain name bandwidth of each of the same domain names at the current site and reports the domain name bandwidth information containing the sitewide bandwidth of each domain name to the global bandwidth control server. The global bandwidth control server further aggregates the domain name bandwidth information reported by the plurality of on-site bandwidth management servers to obtain the overall bandwidth of each of the same domain names in the current network. The global bandwidth control server may determine the target domain name having the domain name bandwidth exceeding the specified bandwidth threshold and may determine the to-be-adjusted bandwidth corresponding to the target domain name. The to-be-adjusted bandwidth may be allocated among the plurality of sites. Eventually, the bandwidth control threshold of the target domain name for each site may be determined. The global bandwidth control server sends the flow control instruction containing the bandwidth control threshold to the on-site bandwidth management server at the corresponding site, such that the on-site bandwidth management server adjusts the domain name bandwidth of the target domain name for each node server at the site. From a global perspective, the overall bandwidth of the target domain name is reduced. Thus, the technical solution provided by the embodiments of the present disclosure can globally adjust the bandwidth of the customer.

BRIEF DESCRIPTION OF THE DRAWINGS

In order to more clearly illustrate the technical solutions in the embodiments of the present disclosure, drawings used in the description of the embodiments will be briefly described below. The drawings in the following description are only some embodiments of the present disclosure. Other drawings may also be obtained by those of ordinary skill in the art without inventive work.

DETAILED DESCRIPTION

To make the objectives, technical solutions, and advantages of the present disclosure clearer, the following further describes the embodiments of the present disclosure in details with reference to the accompanying drawings.

Figure 1:
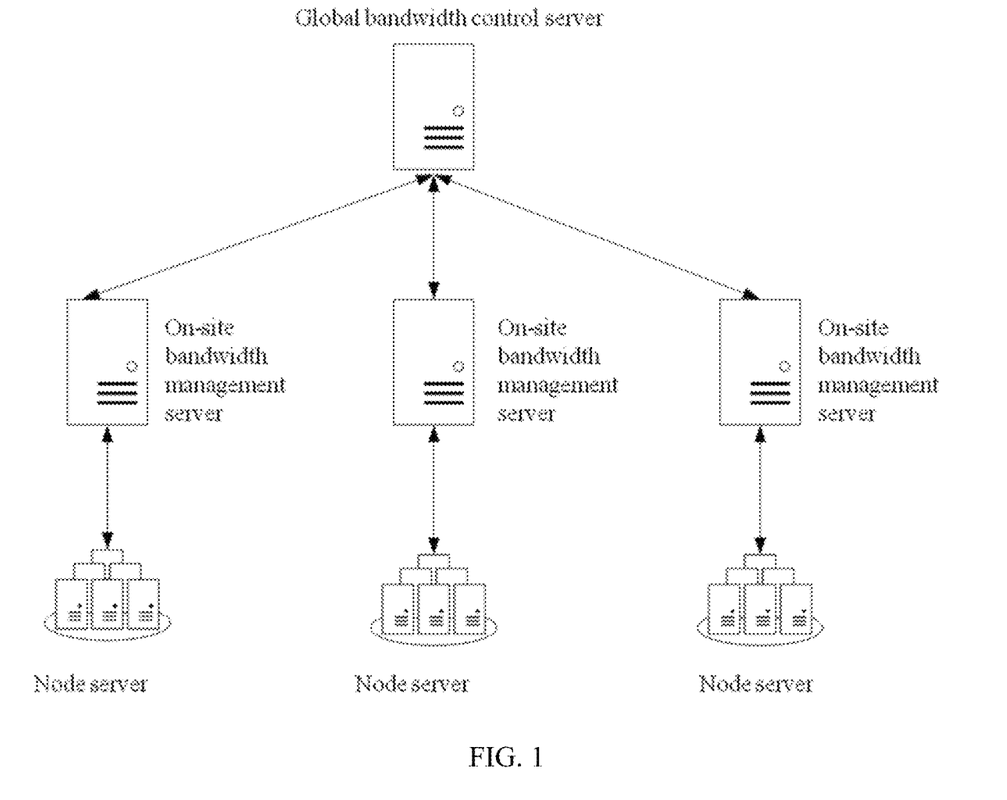
FIG. 1 illustrates a schematic diagram of an exemplary system architecture according to disclosed embodiments of the present disclosure.

The present disclosure provides a method for domain name bandwidth adjustment. The method may be applied to a system architecture as shown in FIG. 1. The system architecture may include a global bandwidth control server, a plurality of on-site bandwidth management servers, and a plurality of node servers (referred to as a node hereinafter). In the system architecture, each site is equipped with one on-site bandwidth management server and includes the plurality of node servers. The plurality of node servers may be centrally managed by the on-site bandwidth management server. The content delivery network (CDN) also includes a global bandwidth control server. The global bandwidth control server may centrally manage the plurality of on-site bandwidth management servers distributed at individual sites.

Figure 2:
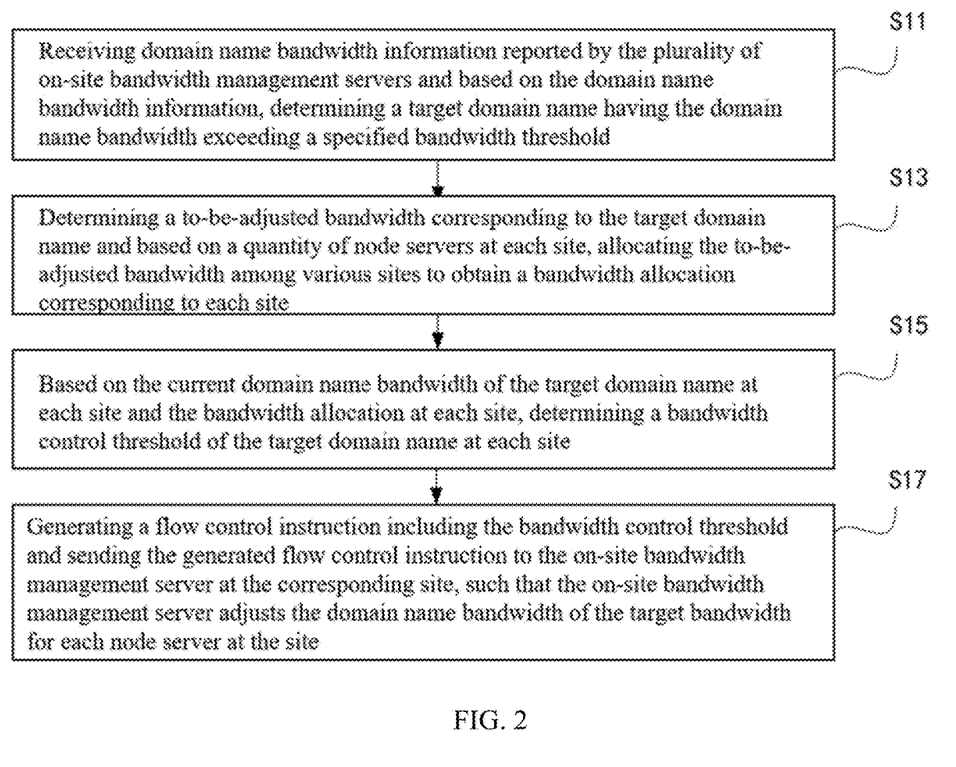
FIG. 2 illustrates a schematic diagram of an exemplary method for domain name bandwidth adjustment performed by a global bandwidth control server according to disclosed embodiments of the present disclosure.
Figure 3:
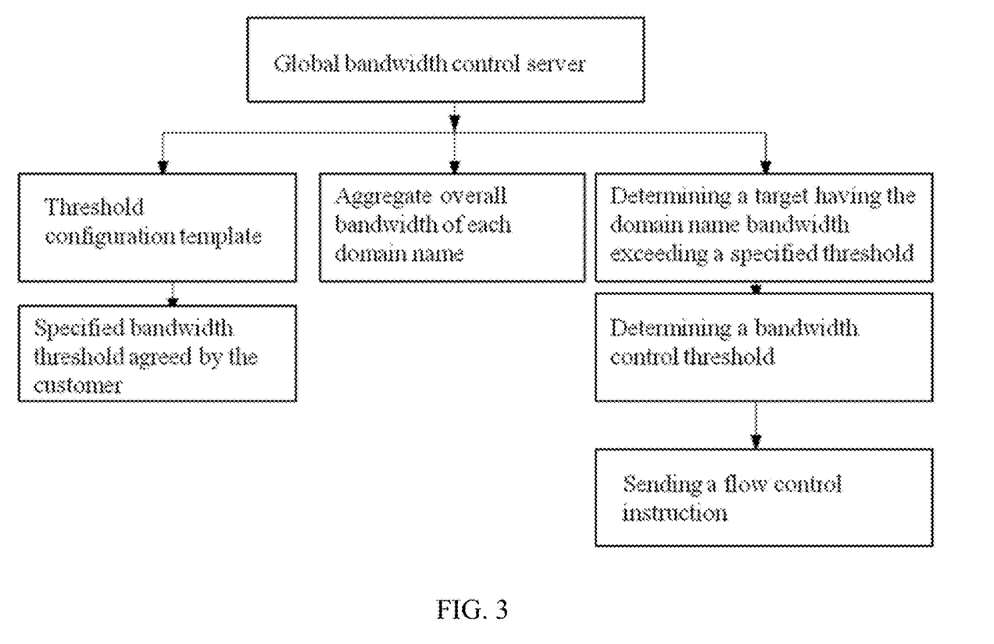
FIG. 3 illustrates a flowchart of an exemplary method for domain name bandwidth adjustment performed by a global bandwidth control server according to disclosed embodiments of the present disclosure.

The present disclosure provides the method for domain name bandwidth adjustment. The method may be performed primarily by the global bandwidth control server. Referring to FIG. 2 and FIG. 3, the method may include the following steps.

S11: receiving domain name bandwidth information reported by the plurality of on-site bandwidth management servers and based on the domain name bandwidth information, determining a target domain name having the domain name bandwidth exceeding a specified bandwidth threshold.

In one embodiment, each of the plurality of node servers on site may self-collect node bandwidth information. The node bandwidth information may include bandwidths for each served domain name. After each of the plurality of node servers self-collects the node bandwidth information respectively, the node bandwidth information may be reported to the on-site bandwidth management server corresponding to the plurality of node servers. As such, the on-site bandwidth management server may receive the node bandwidth information from the plurality of node server on site. Because the same customer may simultaneously access more than one node server, the node bandwidth information received by the on-site bandwidth management server may include duplicated domain names. To control the overall bandwidth of each domain name, the on-site bandwidth management server may aggregate a sitewide bandwidth for each domain name based on the received node bandwidth information. For example, at one site, domain name 1 is accessed by two node servers. The node bandwidth information reported by one node server indicates that the bandwidth of the domain name 1 is 200M while the node bandwidth information reported by another node server indicates that the bandwidth of the domain name 1 is 400M. Thus, after the on-site bandwidth management server performs an aggregation process, the total bandwidth of the domain name at the site is 600M.

In one embodiment, each on-site bandwidth management server may aggregate the sitewide bandwidth for each domain name and may report the aggregated sitewide bandwidth for each domain name to the global bandwidth control server as the domain name bandwidth information for the site. After the global bandwidth control server receives the domain name bandwidth information reported by the plurality of on-site bandwidth management servers, the global bandwidth control server may further aggregate the domain name bandwidth information to determine the overall bandwidth for each domain name within the entire CDN. Specifically, the global bandwidth control server may recognize the domain name bandwidth contained in the received domain name bandwidth information and may aggregate the domain name bandwidth for each domain name, thereby obtaining the overall bandwidth for each domain name.

In one embodiment, as shown in FIG. 3, each domain name may be configured with a specified bandwidth threshold through a threshold configuration template in the global bandwidth control server. The specified bandwidth threshold may be agreed by the CDN operator and the domain name administrator. Alternatively, the specified bandwidth threshold may take a default value. As such, the global bandwidth control server may store the specified bandwidth thresholds of various domain names. After the overall bandwidth for each domain name is aggregated, the global bandwidth control server may determine the target domain name having the domain name bandwidth exceeding a specified bandwidth threshold. For example, for a current domain name, if the overall bandwidth exceeds the specified bandwidth threshold corresponding to the current domain name, the current domain name may be determined to the target domain name having the domain name bandwidth exceeding the specified bandwidth threshold. The bandwidth of the target domain name needs to be adjusted, such that the adjusted overall bandwidth of the target domain name is smaller than or equal to the corresponding specified bandwidth threshold.

S13: determining a to-be-adjusted bandwidth corresponding to the target domain name and based on a quantity of node servers at each site, allocating the to-be-adjusted bandwidth among various sites to obtain a bandwidth allocation corresponding to each site.

In one embodiment, the global bandwidth control server may use a difference between the current domain name bandwidth of the target domain name and the specified bandwidth threshold as the to-be-adjusted bandwidth corresponding to the target domain name. For example, after the aggregation, the current domain name bandwidth of the target domain name is 600M and the specified bandwidth threshold is 200M. Thus, the current to-be-adjusted bandwidth is 400M In one embodiment, the to-be-adjusted bandwidth needs to be adjusted by coordinating between various sites, such that the overall bandwidth of the target domain name may be reduced smoothly. In practical applications, the bandwidth adjustment may be performed only at the sites accessing the target domain name. The sites not accessing the target domain name may not participate in the bandwidth adjustment of the target domain name. Specifically, the global bandwidth control sever may allocate the to-be-adjusted bandwidth among the sites accessing the target domain name based on a quantity of the node servers at each site, such that each site obtains the corresponding bandwidth allocation. In practical applications, the more the node servers are included at a site, the more bandwidth allocation is undertaken by the site. As such, in one embodiment, a ratio of the quantity of the node servers at the current site over the total quantity of the node servers at all the sites accessing the target domain name is calculated. For example, the current site includes 6 node servers and all the sites accessing the target domain name include 60 node servers. The ratio of the node servers at the current site is 10%. Then, a product of the to-be-adjusted bandwidth and the calculated ratio is the bandwidth allocation for the current site. For example, the to-be-adjusted bandwidth is 400M. The bandwidth allocation for the current site is 400M*10%=40M. The current site may refer to any of the sites accessing the target domain name. As such, the bandwidth allocation is based on the ratio of the quantity of the node servers at the site. Thus, the site including more node servers is ensured to undertake more bandwidth allocation.

However, in practical applications, the site including a large quantity of the node servers may already undertake a large bandwidth load. If the bandwidth allocation is strictly based on the ratio of the quantity of the node servers at the site, the site including the large quantity of the node servers may be disproportionally overloaded. Therefore, in one embodiment, the bandwidth allocation may be adjusted slightly. For example, the sites accessing the target domain name include a first site and a second site. A first ratio of the quantity of the node servers at the first site over the total quantity of the node servers at all the sites accessing the target domain name and a second ratio of the quantity of the node servers at the second site over the total quantity of the node servers at all the sites accessing the target domain name may be calculated. The quantity of the node servers at the first site is greater than the quantity of the node servers at the second site. For example, the first ratio may be calculated to be 20% and the second ratio may be calculated to be 10%. An initial bandwidth allocation for the first site is the product of the to-be-adjusted bandwidth and the first ratio and an initial bandwidth allocation for the second site is the product of the to-be-adjusted bandwidth and the second ratio. For example, the to-be-adjusted bandwidth is 400M. The initial bandwidth allocation for the first site is 80M and the initial bandwidth allocation for the second site is 40M.

In one embodiment, a pre-set parameter may be used to slightly adjust the calculated initial bandwidth allocation. The pre-set parameter may be a value configured flexibly based on the actual requirements. For example, in one embodiment, the pre-set parameter is 0.12. A ratio of the quantity of the node servers at the first site over the quantity of the node servers at the second site is calculated. A product of the calculated ratio and the pre-set parameter is an adjustment parameter. For example, the ratio of the quantity of the node serves at the first site over the quantity of the node servers at the second site is 2:1. The product of the calculated ratio and the pre-set parameter is 2*0.12=0.24. The adjustment parameter is 0.24. Then, the product of the initial bandwidth allocation for the first site and the adjustment parameter is 80M*0.24=19.2M. The difference between the initial bandwidth allocation (80M) for the first site and the calculated product (19.2M) is the bandwidth allocation (80M−19.2M=60.8M) for the first site. Similarly, the product of the initial bandwidth allocation for the first site and the adjustment parameter is 80M*0.24=19.2M. The sum of the initial bandwidth allocation (40M) for the second site and the calculated product (19.2M) is the bandwidth allocation (40M+19.2M=59.2M) for the second site. As such, the total bandwidth of the two sites is not reduced. The bandwidth allocation for each site is slightly adjusted, such that the site having the larger quantity of the node servers undertakes slightly lower bandwidth.

In addition to the above two bandwidth allocation methods, the to-be-adjusted bandwidth may be flexibly allocated among a plurality of sites according to actual requirements, which is not limited by the present disclosure.

S15: based on the current domain name bandwidth of the target domain name at each site and the bandwidth allocation at each site, determining a bandwidth control threshold of the target domain name at each site.

In one embodiment, after the bandwidth allocation at each site accessing the target domain name is determined, for each current site of the plurality of sites, a difference between the current domain name bandwidth of the target domain name at the current site and the bandwidth allocation at the current site is the bandwidth control threshold at the current site. For example, the current domain name bandwidth of the target domain name at one site is 300M. The bandwidth allocation for the site is 60M. After the bandwidth adjustment is performed at the site, the overall bandwidth of the target domain name may not exceed 300M−60M=240M. Thus, 240M may be the bandwidth control threshold of the target domain name at the site.

S17: generating a flow control instruction including the bandwidth control threshold and sending the generated flow control instruction to the on-site bandwidth management server at the corresponding site, such that the on-site bandwidth management server adjusts the domain name bandwidth of the target bandwidth for each node server at the site.

In one embodiment, after the global bandwidth control server calculates the bandwidth control threshold of the target domain name at each site, the global bandwidth control server generates the flow control instruction including the bandwidth control threshold and sends the generated flow control instruction to the on-site bandwidth management server at the corresponding site. As such, the on-site bandwidth management server may subsequently adjust the domain name bandwidth of the target domain name for each node server at the corresponding site based on the bandwidth control threshold defined in the flow control instruction.

Figure 4:
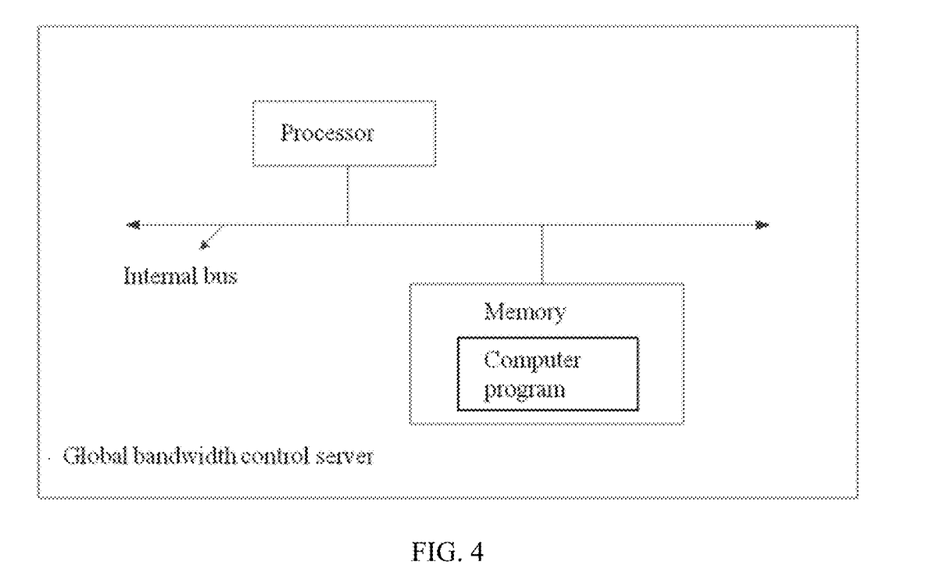
FIG. 4 illustrates a schematic diagram of an exemplary global bandwidth control server according to disclosed embodiments of the present disclosure.

Referring to FIG. 4, the present disclosure also provides a global bandwidth control server. The global bandwidth control server incudes a memory configured to store a computer program and a processor configured to execute the computer program stored in the memory to implement the method for the domain name bandwidth adjustment to be executed by the global bandwidth control server.

Figure 5:
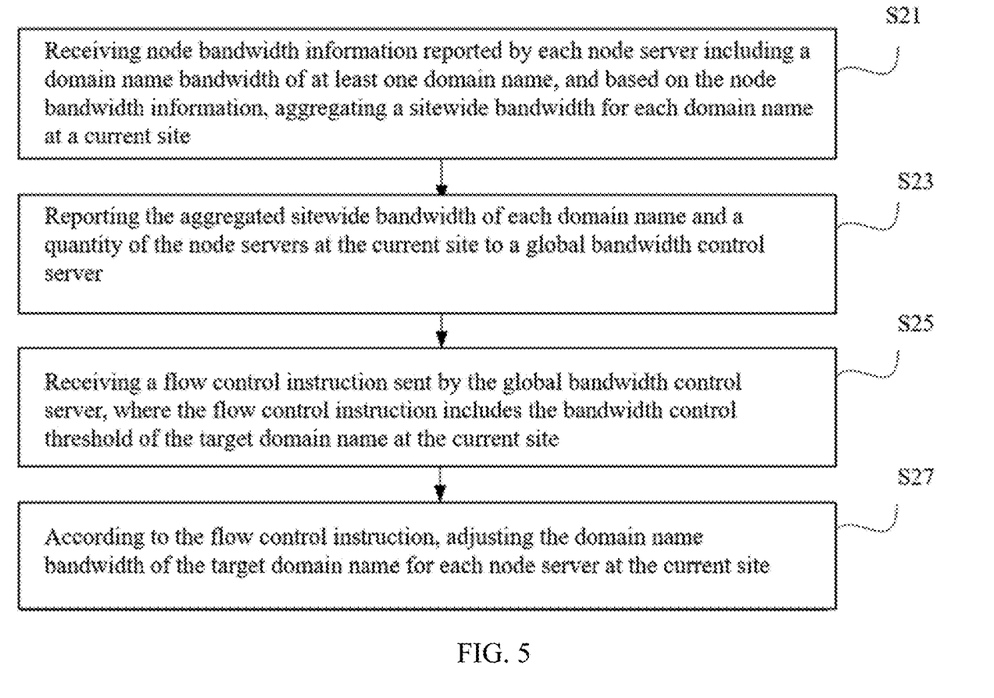
FIG. 5 illustrates a schematic diagram of an exemplary method for domain name bandwidth adjustment performed by an on-site bandwidth management server according to disclosed embodiments of the present disclosure.
Figure 6:
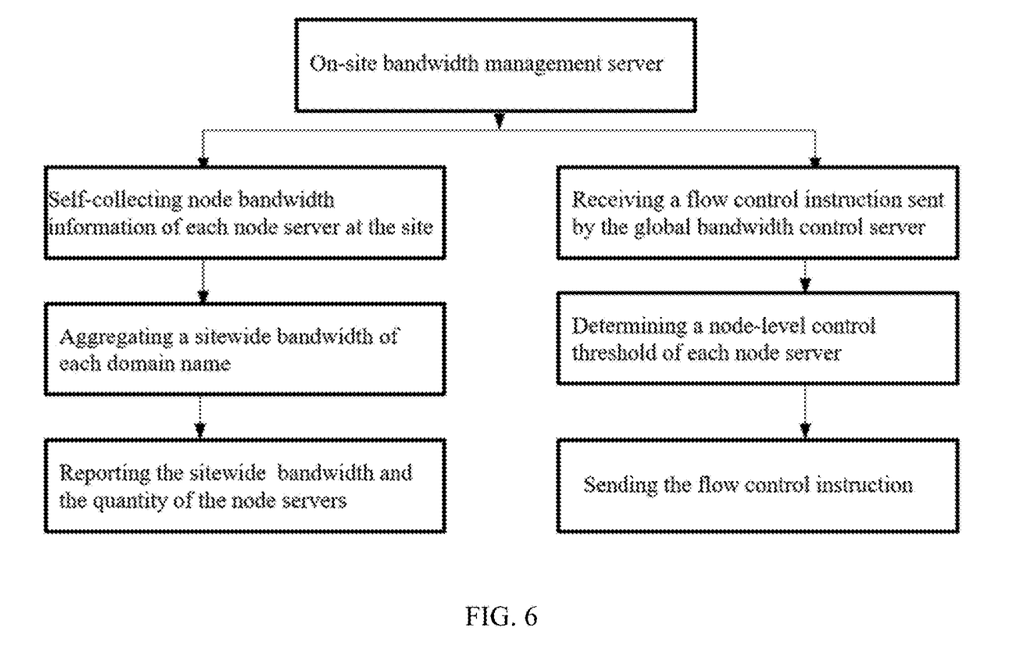
FIG. 6 illustrates a flowchart of an exemplary method for domain name bandwidth adjustment performed by an on-site bandwidth management server according to disclosed embodiments of the present disclosure.

The present disclosure also provides a method for the domain name bandwidth adjustment to be executed by the on-site bandwidth management server. Referring to FIG. 5 and FIG. 6, the method for the domain name bandwidth adjustment may include the following steps.

S21: receiving node bandwidth information reported by each node server including a domain name bandwidth of at least one domain name, and based on the node bandwidth information, aggregating a sitewide bandwidth for each domain name at a current site.

In one embodiment, each node server at the site may self-collect the node bandwidth information. The node bandwidth information may include a bandwidth of each domain name served by the node server. After the node servers self-collect the node bandwidth information respectively, the node servers may report the node bandwidth information to the on-site bandwidth management server at the current site where the node servers are located. As such, the on-site bandwidth management server may receive the node bandwidth information from the node servers at the current site. Because the same customer may simultaneously access a plurality of node servers, the node bandwidth information received by the on-site bandwidth manager server may include duplicated domain names. To control the overall bandwidth of each domain name, the on-site bandwidth management server may aggregate the sitewide bandwidth of each domain name at the current site. In particular, the on-site bandwidth management server may recognize the domain name bandwidth of each domain name included in the node bandwidth information, and aggregate the domain name bandwidth of the same domain name to obtain the sitewide bandwidth of each domain name. For example, at the current site, the domain name 1 is accessed by two node servers. The node bandwidth information reported by one of the two node servers indicates that the domain name bandwidth of the domain name 1 is 200M while the node bandwidth information reported by the other of the two node servers indicates that the domain name bandwidth of the domain name 1 is 400M. Thus, after the on-site bandwidth management server performs the aggregation process, the sitewide bandwidth of the domain name 1 is 600M.

S23: reporting the aggregated sitewide bandwidth of each domain name and a quantity of the node servers at the current site to a global bandwidth control server.

In one embodiment, the on-site bandwidth management server may aggregate the domain name bandwidth of each domain name at the site managed by the on-site bandwidth management server and may report domain name bandwidth information including the aggregated sitewide bandwidth of each domain name to the global bandwidth control server. In addition, the on-site bandwidth management may also report the quantity of the node servers managed by the on-site bandwidth management server at the current site to the global bandwidth control server.

In practical applications, to increase data reporting efficiency and reduce data reporting frequency, the on-site bandwidth management server may report the sitewide bandwidth of each domain name and the quantity of the node servers to the global bandwidth control server at a specified time interval, or may report the sitewide bandwidth of each domain name and the quantity of the node servers to the global bandwidth control server after a data volume of the sitewide bandwidth of each domain name and the quantity of the node servers reaches a specified threshold, or may report the sitewide bandwidth of each domain name and the quantity of the node servers to the global bandwidth control server after receiving a data reporting instruction. The specified threshold may be pre-configured at the on-site bandwidth management server. The data reporting instruction may be sent by the global bandwidth control server or may be sent to the on-site bandwidth management server by any of the node servers.

As such, after the global bandwidth control server receives the sitewide bandwidth of each domain name and the quantity of the node servers reported by each on-site bandwidth management server, the global bandwidth control server may determine the bandwidth control threshold of the target domain name at each site and may send the flow control instruction including the bandwidth control threshold to each on-site bandwidth management server according to the aforementioned technical solution.

S25: receiving a flow control instruction sent by the global bandwidth control server, where the flow control instruction includes the bandwidth control threshold of the target domain name at the current site.

S27: according to the flow control instruction, adjusting the domain name bandwidth of the target domain name for each node server at the current site.

In one embodiment, after the on-site bandwidth management server receives the flow control instruction sent by the global bandwidth control server, the on-site bandwidth management server may parse the target domain name and the corresponding bandwidth control threshold included in the flow control instruction. Then, the on-site bandwidth management server may evenly allocate the bandwidth control threshold of the target domain name among the node servers according to the current domain name bandwidth of the target domain name of each node server. In particular, a ratio of the current domain name bandwidth of the target domain name of each node server at the current site over the sitewide bandwidth of the target domain name may be calculated respectively. For example, at the current site, the target domain name is accessed by two node servers. The current domain name bandwidth for one of the two node servers is 200M and the current domain name bandwidth for the other of the two node servers is 300M. The bandwidth ratios corresponding to the two node servers are 40% and 60%, respectively. Then, based on the bandwidth ratios and the bandwidth control threshold of the target domain name included in the flow control instruction, a node-level control threshold of the target domain name for each node server may be calculated. In particular, a product of the bandwidth control threshold of the target domain name and the bandwidth ratio is the node-level control threshold for the corresponding node server. For example, the control threshold of the target domain name is 400M. Then, the node-level control threshold for the node server having the current domain name bandwidth 200M is 400M*0.4=160M, and the node-level control threshold for the node server having the current domain name bandwidth 300M is 400M*0.6=240M. In other words, the domain name bandwidth of the target domain name for one of the two node servers is reduced form 200M to 160M and the domain name bandwidth of the target domain name for the other of the two node servers is reduced from 300M to 240M.

In practical applications other methods may be used to determine the node-level control threshold. For example, referring to the aforementioned method, a pre-set parameter may be used to slightly adjust the initially determined node-level control threshold, such that the node-level control threshold for the node server with a large current domain name bandwidth is increased accordingly.

In one embodiment, after the on-site bandwidth management server calculates the node-level control threshold for each node server, the node-level control threshold may be sent to the corresponding node server at the current site. Thus, the bandwidth of the target domain name for the node server is adjusted to smaller than or equal to the node-level control threshold.

The present disclosure also provides an on-site bandwidth management server. The on-site bandwidth management server includes a memory configured to store a computer program and a processor configured to execute the computer program stored in the memory to implement the method for the domain name bandwidth adjustment to be executed by the on-site bandwidth management server.

Figure 7:
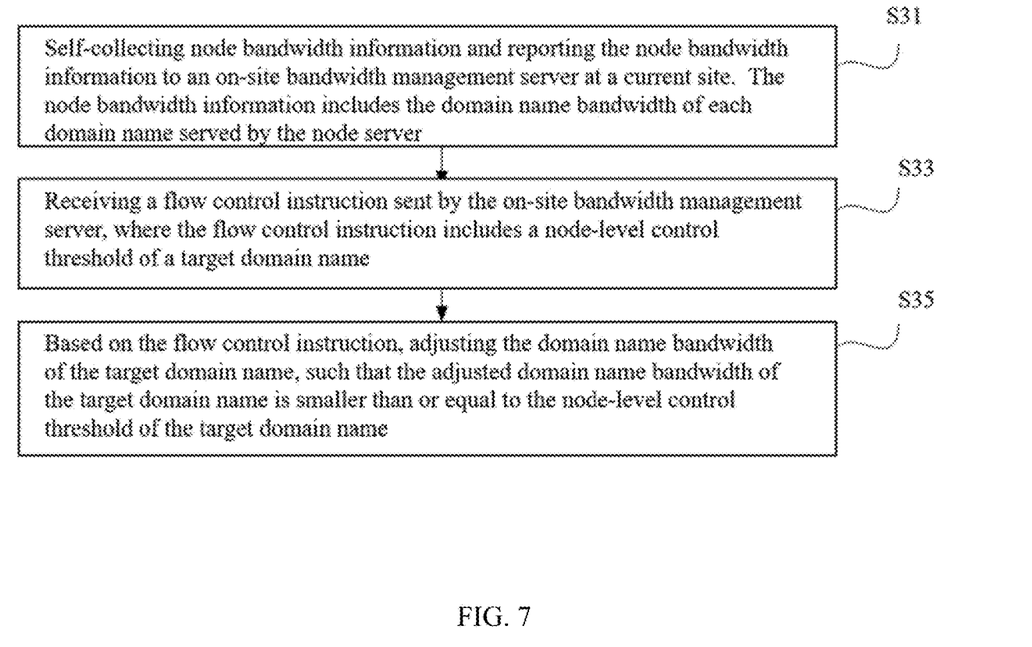
FIG. 7 illustrates a schematic diagram of an exemplary method for domain name bandwidth adjustment performed by a node server according to disclosed embodiments of the present disclosure.
Figure 8:
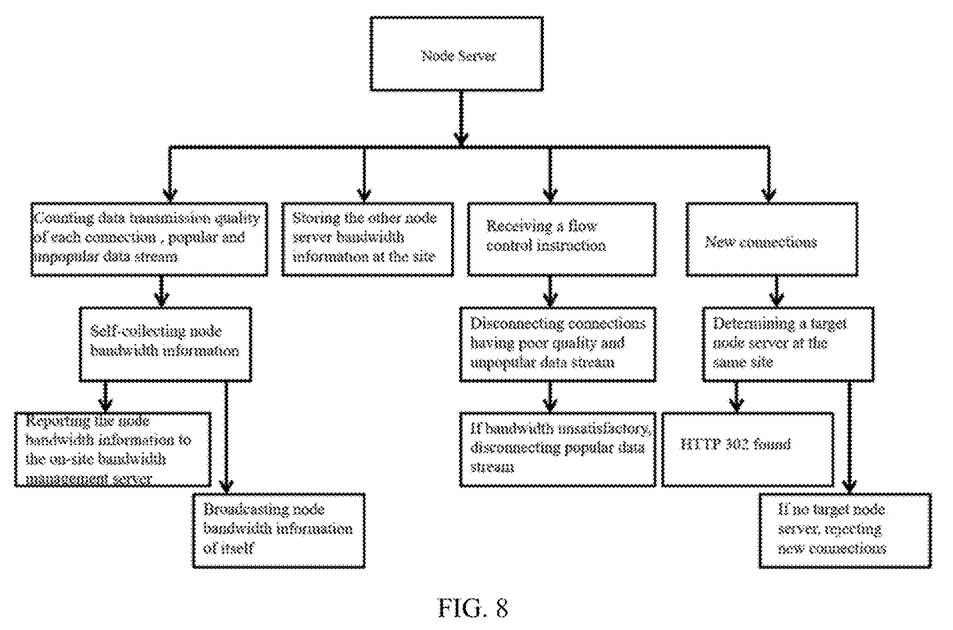
FIG. 8 illustrates a schematic diagram of an exemplary method for domain name bandwidth adjustment performed by a node server according to disclosed embodiments of the present disclosure.

The present disclosure also provides a method for the domain name bandwidth adjustment to be executed by a node server. Referring to FIG. 7 and FIG. 8, the method for the domain name bandwidth adjustment may include the following steps.

S31: self-collecting node bandwidth information and reporting the node bandwidth information to an on-site bandwidth management server at a current site. The node bandwidth information includes the domain name bandwidth of each domain name served by the node server.

In one embodiment, each node server at the site may self-collect the node bandwidth information. The node bandwidth information may include the domain name bandwidth of each domain name served by the node server. After each node server at the site self-collects the node bandwidth information respectively, the self-collected node bandwidth information may be reported to the on-site bandwidth management server at the current site.

In practical applications, the node bandwidth information may have a data format. The data format may conform to a communication protocol between the node server and the on-site bandwidth management server. For example, the node server may report the node bandwidth information in a UDP+j son method to the on-site bandwidth management server. In addition, to increase the data reporting efficiency, the node server may report the node bandwidth information to the on-site bandwidth management server at a specified time interval.

Referring to FIG. 8, in one embodiment, in addition to collecting the node bandwidth information, the node server may also count the data transmission quality of each connection under each domain name served by the node server itself and the number of connections of each data stream under each domain name. Specifically, each live streaming domain name may have a plurality of channel information. Data corresponding to each channel information may be a data stream under the live streaming domain name. As such, a same domain name may have a plurality of data streams. Each data stream may have a different number of access connections. The number of the access connections may be used to determine whether the data stream is a popular stream or unpopular stream. If the number of the access connections for a certain data stream is greater than or equal to a specified connection number threshold, it indicates that the data stream is accessed by a substantial number of users, that is, the data stream is popular. Conversely, if the number of the access connections for a certain data stream is smaller than the specified connection number threshold, it indicates that the data stream is unpopular, and the number of connected users is substantially small. In one embodiment, the data transmission quality of each connection may be determined by a combination of multiple indicators. For example, the data transmission quality of the connection may be determined by a connection delay, a packet loss rate, and number of re-transmissions, etc.

S33: receiving a flow control instruction sent by the on-site bandwidth management server, where the flow control instruction includes a node-level control threshold of a target domain name.

S35: based on the flow control instruction, adjusting the domain name bandwidth of the target domain name, such that the adjusted domain name bandwidth of the target domain name is smaller than or equal to the node-level control threshold of the target domain name.

In one embodiment, the on-site bandwidth management server and the global bandwidth control server may perform the domain name bandwidth adjustment to the domain names in the current network. Eventually, the on-site bandwidth management server sends the flow control instruction including the node-level control threshold of the target domain name to each node server at the current site.

In one embodiment, the node server may parse the flow control instruction to extract the node-level control threshold and may determine whether the current domain name bandwidth of the target domain name is greater than the node-level control threshold. If the current domain name bandwidth of the target domain name is greater than the node-level control threshold defined in the flow control instruction, the node server may first disconnect the connections having a poor data transmission quality and may also disconnect the connections of the unpopular data stream, such that the domain name bandwidth of the target domain name is reduced. Specifically, if the current domain name bandwidth of the target domain name is greater than the node-level control threshold defined in the flow control instruction, the node server may disconnect the connections under the target domain name having the transmission quality smaller than a specified quality threshold and/or disconnect the data stream having the number of the connections under the target domain name smaller than the specified connection number threshold. After the bandwidth adjustment process is performed, the node server may further determine whether the adjusted current domain name bandwidth of the target domain is greater than the node-level control threshold defined in the flow control instruction. If the adjusted current domain name bandwidth is smaller than or equal to the node-level control threshold defined in the flow control instruction, the process of adjusting the domain name bandwidth of the target domain name may be terminated. If no data stream has the number of the connections under the target domain name smaller than the specified connection number threshold after the bandwidth adjustment, and the current domain name bandwidth of the target domain name is still greater than the node-level control threshold defined in the flow control instruction, the popular data streams having substantial number of the connections under the target domain name may be randomly disconnected until the current domain name bandwidth of the target domain name is smaller than or qual to the node-level control threshold defined in the flow control instruction. In addition, the data streams may be sorted in an descending order of the number of the connections under the target domain name, and the data stream under the target domain name may be sequentially disconnected from the end of the sorting result. As such, the popular data stream having less number of the connections may be first disconnected until the current domain name bandwidth of the target domain name is smaller than or equal to the node-level control threshold defined in the flow control instruction.

As shown in FIG. 8, in one embodiment, after the node server receives the flow control instruction sent by the on-site bandwidth management server, the node server may broadcast the node bandwidth information of itself and the node-level control threshold of each domain name of itself to other node serves at the current site and may receive the node bandwidth information and the node-level control thresholds broadcasted by the other node servers at the current site. In this case, the node servers at the same site may be aware of the bandwidth loads and node control status for different domain names of the other node servers under the current circumstance. As such, if the current domain name bandwidth of the target domain name is greater than the node-level control threshold defined in the flow control instruction, the node server may perform the following process on new connections under the target domain name. Because the current node server is unable to continue to increase the domain name bandwidth of the target domain name, based on the received node bandwidth information and the node-level control thresholds broadcasted by the other node servers, the current node server may determine a target node server from the other node servers, which has the current domain name bandwidth of the target domain name smaller than the corresponding node-level control threshold, and may redirect the new connections to the target node server according to a pre-set redirect method. For example, the pre-set redirect method may be HTTP 302 Found. In this case, the information broadcasted by the other node serves may be used to determine the current target node server for accommodating the new connections of the target domain name. As such, the new connections of the target domain name may be redirected to the target node server. The new connections are connected not only to secure normal operation of a live streaming service, but also to minimize a surge of the bandwidth load of the node server, and at the same time, to fully utilize idle bandwidth resources of the other node servers.

However, if none of the other node servers includes any target node server that has the current domain name bandwidth of the target domain name smaller than the corresponding node-level control threshold, the current node server can only reject the new connections.

The present disclosure also provides a node server. The node server includes a memory configured to store a computer program and a processor to execute the computer program stored in the memory to implement the method for the domain name bandwidth adjustment to be executed by the node server.

In the technical solute provided by the embodiments of the present disclosure, the node server at the site may report the node bandwidth information for each domain name served by the node server itself to the on-site bandwidth management server. The on-site bandwidth management server aggregates the domain name bandwidth of each of the same domain names at the current site and reports the domain name bandwidth information containing the site-wide bandwidth of each domain name to the global bandwidth control server. The global bandwidth control server further aggregates the domain name bandwidth information reported by the plurality of on-site bandwidth management servers to obtain the overall bandwidth of each of the same domain names in the current network. The global bandwidth control server may determine the target domain name having the domain name bandwidth exceeding the specified bandwidth threshold and may determine the to-be-adjusted bandwidth corresponding to the target domain name. The to-be-adjusted bandwidth may be allocated among the plurality of sites. Eventually, the bandwidth control threshold of the target domain name for each site may be determined. The global bandwidth control server sends the flow control instruction containing the bandwidth control threshold to the on-site bandwidth management server at the corresponding site, such that the on-site bandwidth management server adjusts the domain name bandwidth of the target domain name for each node server at the site. From a global perspective, the overall bandwidth of the target domain name is reduced. Thus, the technical solution provided by the embodiments of the present disclosure can globally adjust the bandwidth of the customer.

Those skilled in the art may appreciate that all or part of the steps in the embodiments of the present disclosure may be implemented by using the computer program to instruct relevant hardware. The computer program stored in the storage medium includes a plurality of instructions to enable a device (such as a microprocessor or an IC chip) or a processor to execute all or part of the steps in the embodiments of the present disclosure. The storage medium includes a USB disk, a portable hard drive, a read-only memory (ROM), a random-access memory (RAM), a magnetic disk, an optical disk, or any suitable medium for storing the program code.

It should be understood by those skilled in the art that the foregoing are merely certain preferred embodiments of the present disclosure and are not intended to limit the present disclosure. Without departing from the spirit and principles of the present disclosure, any modifications, equivalent substitutions, and improvements, etc. shall fall within the scope of the present disclosure.

What is claimed is:

1. A method for domain name bandwidth adjustment to be executed by a global bandwidth control server, comprising:
receiving domain name bandwidth information reported by each on-site bandwidth management server and based on the domain name bandwidth information, determining a target domain name having the domain name bandwidth exceeding a specified bandwidth threshold;

determining a to-be-adjusted bandwidth corresponding to the target domain name, and based on a quantity of node servers included at each site, allocating the to-be-adjusted bandwidth among a plurality of sites to obtain a bandwidth allocation for each of the plurality of sites;

based on a current domain name bandwidth of the target domain name and the bandwidth allocation at each site, determining a bandwidth control threshold of the target domain name for the corresponding site; and generating a flow control instruction containing the bandwidth control threshold, and sending the generated flow control instruction to the on-site bandwidth management server at the corresponding site, wherein the on-site bandwidth management server adjusts the domain name bandwidth of the target domain name in each node server at the site.

2. The method of claim 1, wherein determining the to-be-adjusted bandwidth corresponding to the target domain name includes:

determining a difference between the current domain name bandwidth of the target domain name and the specified bandwidth threshold to be the to-be-adjusted bandwidth corresponding to the target domain name.

3. The method of claim 1, wherein the bandwidth allocation is determined by:

calculating a ratio of the quantity of the node servers at the current site over a total quantity of the node servers at all sites; and determining a product of the to-be-adjusted bandwidth and the calculated ratio to be the bandwidth allocation for the current site.

4. The method of claim 1, wherein the bandwidth allocation is determined by:

calculating a first ratio of a quantity of the node servers at a first site over a total quantity of the node servers at all sites and a second ratio of a quantity of the node servers at a second site over the total quantity of the node servers at all sites, wherein the quantity of the node servers at the first site is greater than the quantity of the node servers at the second site;

determining a product of the to-be-adjusted bandwidth and the calculated first ratio to be an initial bandwidth allocation for the first site and a product of the to-be-adjusted bandwidth and the calculated second ratio to be an initial bandwidth allocation for the second site;

calculating a ratio of the quantity of the node servers at the first site over the quantity of the node servers at the second site and determining a product of the calculated ratio and a pre-set parameter to be an adjustment parameter;

calculating a product of the initial bandwidth allocation for the first site and the adjustment parameter, and determining a difference between the initial bandwidth allocation for the first site and the calculated product to be the bandwidth allocation for the first site; and calculating a product of the initial bandwidth allocation for the second site and the adjustment parameter, and determining a sum of the initial bandwidth allocation for the second site and the calculated product to be the bandwidth allocation for the second site.

5. The method of claim 1, wherein the bandwidth control threshold is determined by:

determining a difference between the current domain name bandwidth of the target domain name at the current site and the bandwidth allocation for the current site to be the bandwidth control threshold for the current site.

6. The method of claim 1, wherein based on the domain name bandwidth information, determining the target domain name having the domain name bandwidth exceeding the specified bandwidth threshold includes:

recognizing the domain name bandwidth contained in the received domain name bandwidth information and aggregating the domain name bandwidth for each domain name to obtain an overall bandwidth for each domain name; and if the overall bandwidth of a current domain name exceeds the specified bandwidth threshold of the current domain name, determining the current domain name to be the target domain name having the domain name bandwidth exceeding the specified bandwidth threshold.

7. A method for domain name bandwidth adjustment to be executed by an on-site bandwidth management server, comprising:

receiving node bandwidth information including at least one domain name bandwidth reported by each node server and based on the node bandwidth information, aggregating a sitewide bandwidth of each domain name at a current site;

reporting the aggregated sitewide bandwidth of each domain name and a quantity of node servers at the current site to a global bandwidth control server;

receiving a flow control instruction sent by the global bandwidth control server, wherein the flow control instruction includes a bandwidth control threshold of a target domain name at the current site; and based on the flow control instruction, adjusting the domain name bandwidth of the target domain name in each node server at the current site.

8. The method of claim 7, wherein based on the node bandwidth information, aggregating the sitewide bandwidth of each domain name at the current site includes:

recognizing the domain name bandwidth of each domain name contained in the node bandwidth information and aggregating the domain name bandwidth for each of the same domain names to obtain a sitewide bandwidth for each domain name.

9. The method of claim 7, wherein reporting the aggregated sitewide bandwidth of each domain name and the quantity of node servers at the current site to the global bandwidth control server includes:

at a specified time interval, or after a data volume of the sitewide bandwidth of each domain name and the quantity of the node servers managed by the on-site bandwidth management server reaches a specified threshold, or after receiving a data reporting instruction, reporting the sitewide bandwidth of each domain name and the quantity of the node servers managed by the on-site bandwidth management server to the global bandwidth control server.

10. The method of claim 7, wherein based on the flow control instruction, adjusting the domain name bandwidth of the target domain name in each node server at the current site includes:

calculating a ratio of the current domain name bandwidth of the target domain name in each node server at the current site over the sitewide bandwidth of the target domain name;

based on the calculated ratio and the bandwidth control threshold of the target domain name contained in the flow control instruction, calculating a node-level control threshold of the target domain name for each node server; and sending the calculated node-level control threshold to the corresponding node server at the current site, wherein the corresponding node server adjusts the domain name bandwidth of the target domain name to be smaller than or equal to the node-level control threshold.

11. A method for domain name bandwidth adjustment to be executed by a node server, comprising:
self-collecting node bandwidth information, and reporting the node bandwidth information to an on-site bandwidth management server at a current site where the node server is located, wherein the node bandwidth information includes domain name bandwidth of each domain name served by the node server;
receiving a flow control instruction sent by the on-site bandwidth management server, wherein the flow control instruction includes a node-level control threshold of a target domain name; and
based on the flow control instruction, adjusting the domain name bandwidth of the target domain name, wherein the adjusted domain name bandwidth of the target domain name is smaller than or equal to the node-level control threshold of the target domain name.

12. The method of claim 11, wherein:
when self-collecting the node bandwidth information, the method further includes counting data transmission quality of each connection under each domain name served by the node server itself and the number of connections of each data stream under each domain name; and
correspondingly, based on the flow control instruction, adjusting the domain name bandwidth of the target domain name includes:
if the current domain name bandwidth of the target domain name is greater than the node-level control threshold defined in the flow control instruction, disconnecting the connection under the target domain name having the data transmission quality smaller than a specified quality threshold and/or disconnecting the data stream under the target domain name having the number of the connections smaller than a specified connection number threshold.

13. The method of claim 12, further including:
if no data stream under the target domain name having the number of connections smaller than the specified connection number threshold, and the current domain name bandwidth of the target domain name is greater than the node-level control threshold defined in the flow control instruction,
randomly disconnecting the data stream under the target domain name until the current domain name bandwidth of the target domain name is smaller than or equal to the node-level control threshold defined in the flow control instruction; or
sorting the data streams under the target domain name in a descending order, and sequentially disconnecting the data stream under the target domain name starting from the end of the sorting result until the current domain name bandwidth of the target domain name is smaller than or equal to the node-level control threshold defined in the flow control instruction.

14. The method of claim 11, wherein after the flow control instruction sent by the on-site bandwidth management server is received, the method further includes:
broadcasting the node bandwidth information of itself and the node-level control threshold of itself to other node servers at the current site and receiving the node bandwidth information and the node-level control thresholds broadcasted by the other node servers at the current site.

15. The method of claim 14, wherein based on the flow control instruction, adjusting the domain name bandwidth of the target domain name includes:
if the current domain name bandwidth of the target domain name is greater than the node-level control threshold defined in the flow control instruction, for new connections under the target domain name, based on the received node bandwidth information and the node-level control thresholds broadcasted by the other node servers, determining a target node server from the other node servers, which has the current domain name bandwidth of the target domain name smaller than the corresponding node-level control threshold, and redirecting the new connections to the target node server according to a pre-set redirect method.

16. The method of claim 15, further including:
if none of the other node servers includes any target node server that has the current domain name bandwidth of the target domain name smaller than the corresponding node-level control threshold, rejecting the new connections.

* * * * *